US008088433B2

(12) United States Patent
Mangos et al.

(10) Patent No.: US 8,088,433 B2
(45) Date of Patent: Jan. 3, 2012

(54) MONONUCLEARLY FILLED MICROCAPSULES

(75) Inventors: Thomas Mangos, Fort Lee, NJ (US); Norbert Fischer, Hoexter (DE); Pierre Chauchadis, Holzminden (DE); Wolfgang Fexer, Griesstatt (DE); Christian Schütte, Bevern (DE)

(73) Assignee: Symrise AG, Holzminden (DE)

( * ) Notice: Subject to any disclaimer, the term of this patent is extended or adjusted under 35 U.S.C. 154(b) by 11 days.

(21) Appl. No.: 12/512,409

(22) Filed: Jul. 30, 2009

(65) Prior Publication Data

US 2009/0291168 A1 Nov. 26, 2009

Related U.S. Application Data

(63) Continuation of application No. 10/485,348, filed as application No. PCT/EP02/14732 on Dec. 23, 2002, now Pat. No. 7,585,538.

(30) Foreign Application Priority Data

Dec. 24, 2001 (DE) ................................ 101 64 110

(51) Int. Cl.
*A23L 1/222* (2006.01)

(52) U.S. Cl. .......... 426/651; 426/89; 426/533; 426/534; 426/650

(58) Field of Classification Search .................... 426/89, 426/96, 103, 533, 534, 650, 651
See application file for complete search history.

(56) References Cited

U.S. PATENT DOCUMENTS

| | | | |
|---|---|---|---|
| 5,759,599 | A | 6/1998 | Wampler et al. |
| 5,902,622 | A | 5/1999 | Owusu-Ansah et al. |
| 6,325,859 | B1 | 12/2001 | De Roos et al. |
| 6,436,461 | B1 | 8/2002 | Bouwmeesters et al. |
| 7,271,142 | B2 | 9/2007 | Mistry et al. |

FOREIGN PATENT DOCUMENTS

| | | |
|---|---|---|
| WO | WO 93/19622 | 10/1993 |
| WO | WO 97/13416 | 4/1997 |

*Primary Examiner* — Leslie Wong
(74) *Attorney, Agent, or Firm* — Duane Morris LLP; J. Rodman Steele, Jr.; Gregory M. Lefkowitz

(57) ABSTRACT

Described are mononuclearly filled seamless microcapsules comprising:
- a capsule shell of a hardened capsule material based on an acid polysaccharide and
- a filler material surrounded on all sides by the capsule shell, including an organoleptitic effective amount of a flavor, wherein the microcapsules is heat stable and/or cooking stable and/or deep fry stable and the water portion in the capsule shell is adjusted to a value of≦50 wt. %, based upon the total mass of the capsule shell.

20 Claims, No Drawings

MONONUCLEARLY FILLED MICROCAPSULES

CROSS-REFERENCE TO RELATED APPLICATIONS

This application is a continuation of U.S. application Ser. No. 10/485,348, filed Jan. 28, 2004, now U.S. Pat. No. 7,585,538, which is a §371 national stage entry of International Application No. PCT/EP02/014732, filed Dec. 23, 2002, which claims priority to DE 101 64 110.0, filed Dec. 24, 2001, which are all incorporated herein by reference.

BACKGROUND OF THE INVENTION

1. Field of Invention

The present invention concerns mononuclearly filled microcapsules, foodstuff compositions and other articles which include one or more mononuclearly filled microcapsules as well as processes for production of mononuclearly filled microcapsules.

2. Related Art of the Invention

In the field of encapsulation of active ingredients (active substances on or in carrier materials) there are frequently problems in particular in the field of foodstuff technology, for example, the incomplete immobilization of the active substances on or, as the case may be, in the carrier material.

In the field of the systems for functionalizing, in particular the release (freeing) of active ingredients (active substances) from out of the carrier materials, these types of problems frequently result from an inappropriate, that is, either incomplete or however also possibly early or delayed, release of the active substance from out of its carrier material.

Although in certain applications, in particular in pharmacology, agrarian chemicals and cosmetics, active substance-carrier material combinations have already been found, which meet the requirements both with respect to the encapsulation efficiency as well as with respect to the requirements in practice regarding releasing, nevertheless in all industrial nations great investment has been made in searching for systems which in certain areas of application make possible a situation-appropriate release of active substances out of a carrier material.

Despite extensive efforts, until now only relatively few functioning systems have been discovered for encapsulation and functionalizing of ingredients in the area of foodstuff technology and foodstuff chemistry. This is due in part to the limited approval of possible carrier materials for the respective ingredients. In particular however problems occur with those types of flavors or fragrances, of which the composition is complex, which is expressed in the diversity of the volatilities and the range of polarity of the individual aroma components of the fragrance or flavor as well as in the sensitivity of one or more of the fragrance or flavor components to external influences.

From the highly developed field of literature regarding active ingredient—release systems, reference can be made to the following documents:

Brandau, Thorstein; Pharma+Food March 2001, 8-12:

In this document microencapsulated active substances and microspheres are described in pharmaceutical and cosmetic applications. As processes for production of microspheres, the so-called microsphere process is specified, which results in highly spherical granules (solid spheres) with monomodal grain size distribution. The one or more active substance is evenly distributed throughout the entire sphere, in a matrix of the carrier material. Further, microcapsules are described, for the production of which a liquid or liquefied active substance is embedded in a solid shell.

WO 93/02785:

This document discloses a process for production of alginate spheres (solid spheres) from droplets of an alginate solution, wherein droplets are released from a nozzle and allowed to drop into an ion solution, which solidifies them. The alginate solution is rendered into droplets by oscillation excitation. Mononuclearly filled capsules are not disclosed.

WO 98/15191:

This document discloses a process for production of spheres (beads) as nutrient—additives, wherein these solid spheres are loaded with at least one active ingredient selected from the group of flavor substances. Mononuclearly filled capsules are not disclosed. Data or information regarding ingredients from the field of flavors or fragrances, in particular water insoluble flavors or fragrances, and technical advantages of the carrier material with respect to heat stability are disclosed, wherein however the release is not spontaneous, but rather occurs continuously during manufacture or preparation, in particular however during storage of the nutrients.

WO 98/15192:

This document discloses a process for production of spheres (beads) as nutrient—additive, wherein in a finishing process step previously manufactured water insoluble spheres (solid balls) are retroactively or subsequently loaded with at least one active, amphiphilic ingredient.

The encapsulation of taste substances (flavor substances) in spheres (beads) brings about that the flavor substances possess an improved thermal stability and water insolubility during the further processing of the beads. The flavor release is however not instantaneous during chewing or breaking of the bead-particles in the mouth, but rather is based upon a continuous and slow process of diffusion of active flavor components out of the encapsulated material into the foodstuff matrix. This is described in particular in WO 98/15191 and in WO 98/15192.

EP 0 513 603 B1:

This document discloses a process for production of seamless capsules, in which a fluid stream is blown out of multiple nozzles for the formation of capsules, so that droplets are formed, which are then brought into contact with a hardening fluid, in order to produce the seamless capsules. These seamless capsules are mononuclearly filled. Information regarding capsule materials is not provided. Information regarding possible ingredients or possible technical advantages of the shell materials in practical applications are likewise not provided.

JP 11155480 A describes microcapsules filled with oily aromatic ingredients, which are obtained by reaction of polysaccharides such as alginates with calcium or metal ions and which are heat and water resistant. The shells of the described capsules exhibit however a high water proportion of greater than 90 wt. %, based upon the capsule shell.

JP 09065853 A describes a microcapsule filled with the flavor substance wasabi which is formed with sodium alginate and a polysaccharide as form and stabilizing adjuvant by means of a two-fluid nozzle and is hardened with calcium chloride. However here the hardened capsule shell material possesses a very high water content, greatly above 50 wt. %.

A high water content in the capsule is very disadvantageous for the performance of a capsule and in particular for its heat stability and its flavor retention value, as has been determined by various experiments within the framework of the present invention.

SUMMARY OF THE INVENTION

It is accordingly a primary task of the present invention to provide a flavor release composition and a process for production thereof, which is efficient with respect to the primary flavor encapsulation and which is universally employable as widely as possible with respect to the selection of the flavors to be encapsulated, that is, in particular, not limited to a certain few oil soluble essences.

Beyond this, the process to be provided should preferably make it possible to produce an at least substantially water insoluble flavor release system, with which the encapsulation of water soluble filler materials is also possible.

The system should further include or possess in its flavor release composition preferably instantaneous release characteristics, that is, a striking release of the flavor at the desired point in time, preferably during ingestion of the nutrients (burst effect).

At the same time the systems to be provided should be resistant to shear forces, preferably at least in such a degree, that they are not disturbed by the shear forces occurring during the normal manufacture or preparation of a foodstuff (nutrient preparation).

Beyond this, the flavor release system to be provided should be heat stable and/or cooking stable and/or deep fry stable (for the definition of these terms, see below).

In technical respects the process to be provided should make possible a continuous production of a homogenous-shaped release system.

With respect to the flavor release system, the primary task is solved by provision of a mononuclearly filled seamless microcapsule, which comprises

- a capsule shell of a hardened capsule material based on an acid polysaccharide and
- a filler material completely enclosed by the capsule shell, including or comprising an organoleptically effective amount of a flavor wherein the microcapsule is heat stable and/or boiling or cooking stable and/or frying or deep fry stable and wherein the water proportion in the capsule is adjusted to a value of ≦50 wt. %, based upon the total mass of the capsule shell.

A mononuclearly filled seamless microcapsule is to be considered heat stable when it maintains its structural integrity when immersed for 15 minutes in a water bath at 50° C. Its structural integrity is more particularly said to be retained, when the filler material has not leaked from the microcapsule following the handling of the microcapsule.

A mononuclearly filled seamless microcapsule according to the invention is considered boiling or cooking stable, when it maintains its structural integrity when subjected to 5 minutes in a water bath at 100° C. It structural integrity is verified particularly when the filler material does not leak from the capsule following the treatment of the microcapsule.

A mononuclearly filled seamless microcapsule according to the invention is to be considered frying or deep fry stable when its structural integrity is maintained following subjecting to 5 minutes in a deep fry bath of molten palm oil at 180° C. It structural integrity is verified particularly when the filler material does not leak from the capsule following the treatment of the microcapsule.

Among mononuclearly filled (micro) capsules there is to be understood, within the framework of the present disclosure, exclusively systems which possess a defined capsule (capsule shell, jacket), which completely enclose a single (mono) core (nucleus) of filler material. Therein the layer of thickness of the capsule shell can be variable, preferably the core assumes the substantially larger proportion of the capsule volume, in order to make possible a high loading of the capsule. The term or concept "mononuclearly filled microcapsule" is thus in particular not applicable for "microspheres", as they have described for example in the above-mentioned article in Pharma+Food March 2001. The just mentioned sphere—systems, in which the active ingredient is present in the form of a finally divided imbedded emulsion or dispersion in the carrier material, are accordingly usually referred to in the literature as "polynuclear capsules". A microcapsule in the sense of the present disclosure has a maximal volume of 65 $mm^3$.

An inventive mononuclearly filled seamless microcapsule can be produced in particular by a process with the following steps:

- providing a liquid, organoleptically effective amount of a flavor-including filler-material for the microcapsules,
- providing a preferably aqueous solution or dispersion of a hardenable capsule material based upon an acid polysaccharide,
- forming discrete droplets of the liquid filler material for the microcapsules and the solution or dispersion of the hardenable capsule (shell) material, so that the hardenable capsule material surrounds on all sides the liquid filler material in the droplets,
- hardening the hardenable capsule (shell) material, so that seamless polysaccharides are formed, which respectively surround the filler material mononuclearly, and which are heat stable and/or cooking stable and/or deep fry stable,
- drying the formed microcapsules, until the water content in the capsule shell reaches a value of ≦50 wt. %, based upon the total mass of the capsule shell.

Preferably a liquid filler material is produced, in that a solution or emulsion of the active flavor substances to be employed (which together produce the organoleptically effective amount of a flavor) is produced.

It is preferred to produce the discrete droplets of the liquid filler material and the solution or dispersion of the hardenable capsule materials in that the mentioned liquids are sent through a concentric multi-nozzle arrangement. The discrete droplets then include at least two different phases (filler material, capsule or ecapsulating material).

The hardening of the hardenable capsule material preferably occurs in that the hardenable capsule material, which in the formed discrete droplets surrounds on all sides the liquid filler material, is contacted with an aqueous solution of multivalent cations (for example Ca-ions), whereupon the acid polysaccharides react with the cations in order to form a seamless solid shell about the liquid filler material.

Following the hardening of the hardenable capsule material the formed capsules are separated from the employed multi-valent cation containing solution in conventional manner, and namely preferably following a very short contact between capsules and hardening bath.

The drying of the formed capsule shell occurs preferably at least partially by a water adsorption or absorption process, which in certain cases can be combined with other drying processes, for example a convective air drying process.

Prior to drying, the capsules separated from the hardening bath are preferably also washed in order to remove any residual multi-valent cations from the capsules surface.

Further details regarding the design of the preferred process are set forth below.

The present invention is also concerned with articles or products, in particular foodstuff compositions, which include one or more inventive mononuclearly filled microcapsules and a carrier material for the microcapsules (M).

Mononuclearly filled microcapsules which are suitable for human consumption are already known. Therein is to be distinguished (a) capsules which are producible by means of multiple nozzle technology, (b) cellular capsules, and (c) coacervation microcapsules.

Regarding capsules type (a) reference is made in particular to the above comments regarding documents JP 11155480 and JP 09065853A.

With respect to the capsule type (b), that is, the cell capsules, reference is made to the documents EP 242 135 A2 and EP 528 466 A1, which respectively disclose encapsulation of active substances in cell material originating from microorganisms.

With respect to capsule type (c), that is, coacervation microcapsules, reference is made to the documents WO 93/19621 and WO 93/19622.

The capsule types (b) and (c) or, as the case may be, the corresponding processes for their production, possess certain advantages and certain disadvantages. Disadvantageous are the conventional manufacturing processes for both capsule types still being batch processes, so that an economic capsule mass production is not possible. The preparation of suitable microorganism cells and the encapsulation in such is besides this technically very demanding and highly liable to problems, and the obtained cell capsules are besides this not particularly stable against shear forces. The processes for production of coacervation microcapsules, which are conventionally carried out with gelatin and an additive such as for example gum arabic, is only suitable under the precondition that the flavor filling material to be surrounded is completely insoluble in an aqueous solution of the gelatin, which results in a commensurately large reduction with respect to the potential complex flavors to be encapsulated. According to the documents WO 93/19621 and WO 93/19622, the active components to be encapsulated are limited to oil soluble components. Coacervation microcapsules are besides this, as a rule, not heat stable, which further substantially reduces their employability.

In order to illustrate the enormous investment which is being carried out in the industry in order to compensate for the above-described disadvantages of the above-described capsule systems and to produce heat stable active substance releasing systems with a high as possible number of potential encapsulable flavors, reference is made to the following documents:

U.S. Pat. No. 5,759,599

This document discloses a process for flavoring and production of foodstuffs by supplementation with flavor oil loaded capsules which are hardened by means of chemical cross-linking and thus more heat stable, which are produced by a coacervation process based upon a protein as shell forming material, and which during chewing are mechanically fractured. As discussed above, these capsules can only be loaded with oil soluble flavor substances.

WO 99/17871

This document discloses a process for encapsulation of amphiphilic flavors in chemically cross-linked coacervation microcapsules, which on the basis of known distribution coefficients are disadvantageously transported from outside into the core of a premanufactured non-flavored capsule, and there are dissolved until reaching a defined equilibrium.

In contrast to the known types of mononuclearly filled capsules, the microcapsules according to the present invention are, in the case of the appropriate design of the manufacturing process, shear force stable, water insoluble, flavor and heat stable (capsules are not dissolvable in the presence of water), without requiring that a supplemental chemical cross-linking reaction be carried out. The inventive production process is significantly simpler than the production of cell capsules or coacervation microcapsules and results also in significantly more uniform microcapsule products. The inventive capsules can be produced by a continuous process and with substantially more constant dimensions. In comparison with the microcapsules which are described in the documents JP 11122480 A and JP 09065853 A, the inventive microcapsules are characterized in particular by an improved heat stability and an improved flavor retention.

The hardened microcapsule (shell) material of the inventive microcapsules comprise—as already described—preferably a substance preferably hardened by contacting with mono-, di- or higher value cations. In the inventive process it is thus preferred to employ an appropriate hardenable substance, which for this is preferably in the form of a solution. Preferred are substances which harden on contact with Ca-ions, for example following dropping into a Ca-ion containing bath.

The capsule (shell) material for the microcapsules is in preferable manner selected from the group comprising alginate, pectate, pectinate, carrageenan, gellan and their mixtures. The listed materials are solidifible via cations and form in the hardened state particularly heat stable and water insoluble capsules with a high shear stability. Suitable cations for hardening the listed materials are know to the person of ordinary skill.

The inventive mononuclearly filled seamless microcapsules include in their filler materials an organoleptically effective amount of a flavor. This flavor includes preferably one or more flavor substances in the sense of the European Union Flavor Guidelines 88/388/EWG, that is, one or more fragrance and flavor imparting substances which are present either naturally in consumables (for example in fruits) or are added to consumables in order to impart thereto appropriate fragrance and taste.

It has been found to be particularly advantageous that the inventive employed flavor can possess amphiphilic characteristics and need not be transported into the filler material by diffusion from outside following production of the capsule shell.

Within the framework of the present invention it is in general important to employ measures which ensure that during the production no unacceptable amount of the flavor defuses out of the filler material into the capsule shell and in certain cases even out of this. This type of measure includes for example the (rapid) separating of the capsules from the hardening bath, the washing of the capsules and the drying of the capsules (see above). Frequently the inventive mononuclearly filled seamless microcapsules include as filler material a lipophilic solvent (for example a plant oil), in which a flavor is dissolved. In the production of the inventive microcapsules there is generally employed besides this an aqueous solution of a hardenable capsule material. The distribution of a (for example amphiphilic) flavor substance between the filler and the capsule material during the production of the inventive microcapsules can be described by the corresponding or appropriate distribution coefficient. For reasons of providing a better overview of the invention it is however more convenient to provide, in place of the distribution coefficient for the concentration equilibrium between the phase filler material and the capsule material, the distribution coefficient between n-octanol and water, which in the literature are conventionally employed for characterizing substances. For a given temperature (for example T=25° C.) the relationship of the concentrations of a given flavor substance in the two phases n-octanol and water is constant; the distribution coefficient $K_{o/w}$ is a material constant, just like the absorption logarithm of the distribution coefficient $\log K_{o/w}$ (also characterized as $\log P_{o/w}$). It is true that $\log K_{o/w}(=\log P_{o/w})=\log_{10}[c_o/c_w]$ with $c_o$=concentration of a flavor substance in n-octanol; $c_w$=concentration of the same flavor substance in water.

For the purpose of the present invention the flavor substances can be divided into three groups, depending upon their $\log K_{o/w}$ and namely so, that each group is associated with a degree of difficulty for encapsulation of the respective flavor substance.

Flavor substances with a $\log K_{o/w} \geqq 2$ are lipophilic compounds, which are quite easy to encapsulate. An inventive microcapsule can include in the filler material (core) more than 50 and up to 95 wt. % of flavor substances with a $\log K_{o/w} \geqq 2$, based upon the total mass of the capsule. In this first group of flavor substances there are substances such as carvone ($\log K_{o/w}$=2.23), gamma-decalactone ($\log K_{o/w}$=2.42), ethyl-caproate ($\log K_{o/w}$=2.83), linalool ($\log K_{o/w}$=3.28) and beta-pinene ($\log K_{o/w}$=4.37).

Flavor substances with a $\log K_{o/w}$ between 1 and 2 can be considered as amphiphilic compounds and are already more difficult to encapsulate. A microcapsule according to the invention can include in its filler material (core) at least 10 wt. % and up to 50 wt. % of flavor substances with a $\log K_{o/w}$ between 1 and 2, based upon the total mass of the capsule. In the second group of flavor substances there are substances such as ethyl butyrate ($\log K_{o/w}$=1.77), benzaldehyde ($\log K_{o/w}$=1.64), isoamyl alcohol ($\log K_{o/w}$=1.28), ethyl propionate ($\log K_{o/w}$=1.24) and diacetyl (butanedione) ($\log K_{o/w}$=1.33).

Flavor substances with a $\log K_{o/w} \leqq 1$ are amphiphilic to hydrophilic substances and are particularly difficult to encapsulate. A microcapsule according to the invention can include in its filler material at least 1 wt. % and up to 10 wt. % of flavor substances with a $\log K_{o/w} \leqq 1$, based upon the total mass of the capsule. In this third group of flavor substances there are substances such as ethyl lactate ($\log K_{o/w}$=0.88), anisaldehyde ($\log K_{o/w}$=0.95), butyric acid ($\log K_{o/w}$=0.78), ethylacetate ($\log K_{o/w}$=0.75).

For organoleptic reasons the flavor contained in dissolved or dispersed form in the filler material of the microcapsule according to the invention usually contains at least 10 wt. %, based upon the total mass of the flavor in the filler material, of one or more flavor substances with a $\log K_{o/w}<2$. If the flavor is present in the filler material in dissolved form, then the proportion of flavor substances with a $\log K_{o/w}<1$ should however be maintained as small as possible in order to prevent unacceptable flavor losses and preferably not more than 1 wt. %, based upon the total mass of the flavor in the filler material. If the flavor in the filler material is in dispersed form, for example an emulsified form, then the danger of a passage over of flavor substances into the capsule shell is reduced in comparison to a dissolved flavor, so that also one or more flavor substances with a $\log P_{o/w}<1.0$ can be contained in the flavor, for example in the range of 0.5-3.0 wt. % based upon the total mass of the flavor in the filler material.

It becomes possible with the inventive process to produce mononuclearly filled microcapsules in which several or all of the following characteristics coexist:

1. High retention of amphiphilic active substance components (in particular flavor substances) in the core during the hardening and drying of the shell material up until the finished end products;
2. High stability of encapsulated active substance components during storage;
3. Low interaction between filler material and capsule material;
4. High formal and/or mechanical and/or chemical stability of the microcapsule relative to conditions as they exist conventionally during the further processing of microcapsules (for example mixing, frying, baking or cooking).
5. Controlled but rapid release of the active substance contained in the filler material at the intended end-use of the microcapsules, that is, for example, during eating of a consumable which includes microcapsules filled with flavor substances.

For production of the filler material (for example, the core of the microcapsule), there is—as already described—usually first produced (a) a solution of the flavor substance to be incorporated in an oil or (b) a water-in-oil emulsion, which includes in its inner aqueous phase the flavor substance. The term "oil" includes for the purposes of this invention both liquid plant oils as well as meltable plant or animal fats. As a rule it is advantageous to select an oil which readily dissolves the flavor substance to be taken up and at the same time is suitable for human consumption. In the case of employment of water-in-oil emulsions it can be advantageous to include emulsifiers in the oil phase, which are suitable to stabilize the emulsion. By addition of a small amount of water, which preferably does not exceed 10 wt. % (based upon the liquid filler material) and a suitable emulsifier with a HLB-value (hydrophilic-lipophilic balance) of preferably less <5 within the filler material (core system) it becomes possible to produce a stable water-in-oil emulsion. The emulsifiers are, for this purpose, preferably selected from the group consisting of mono-diglycerides, monoglycerides, polyglycerol esters, sorbitan esters and their mixtures. The production of the water-in-oil (w/o) emulsion within the filler material (core phase) improves the retention of the water soluble flavor substance. The emulsifier can also be included in the oil phase in the solution without addition of water. The emulsifier includes the more water soluble flavor substance components within the liquid filler material in the form of micelles.

Flavor substances which are solid at room temperature can be dispersed in liquid oil, wherein in certain cases dispersion aids can be added.

For producing the solution or dispersion of a hardenable capsule material based upon an acid polysaccharide, in accordance with the inventive process conventionally the polysaccharide material, for example the sodium salt of the alginic acid, is dissolved or dispersed in an aqueous solvent. Non-volatile, water soluble or water insoluble dispersible substances can be added at this time, for example (a) glycerin, propyleneglycol or other agents for improving the mechanical characteristics of the (dried) mononuclearly filled microcapsules to be produced by plastifying of the capsule (shell) or (b) proteins and/or saccharides for modification of the capsule composition.

In a preferred inventive process the solutions or dispersions of the hardenable capsule material and the liquid filler material are added separately from each other into a system, for example a multi-nozzle system, wherein the system is so designed, that discrete droplets are formed from the fluid filler material for the microcapsules and the solution or dispersion of the hardenable capsule material for the microcapsules, wherein the hardenable capsule material encloses or surrounds the liquid filler material. Suitable double nozzle systems are described in the literature, and for this reference is again made to the documents EP 0 513 603 B1 and WO 93/02785.

The said discrete droplets are comprised of an inner flavor core (filler material), which is enclosed on all sides by the outer polysaccharide shell (capsule jacket). Core, shell and whole capsule are preferably spherical. The core phase is preferably centered exactly within the capsule shell phase, which means, that the thickness of the capsule shell at each point of the seamless microcapsule is the same. A design of this type contributes in great amount to a qualitatively high valued capsule. The centering of the capsule core (filler material) can be achieved by a suitable selection from the following parameters: relationship of the diameter of inner and outer nozzles; relationship of the flow-through rates through the inner and the outer nozzle; frequency and amplitude of the optionally present vibrator for the multiple nozzles; intrinsic characteristics of the employed liquids (for filler material and capsule (shell) material).

For hardening of the formed discrete droplets these are introduced or dropped into a preferably aqueous or water-alcohol solution of multi-valent cations. The selection of the multi-valent cations is adapted to or based on the type of the employed hardenable capsule material. To the extent that calcium ions can be employed for hardening of an employed acidic polysaccharide, the solution of multi-valent cations preferably includes a dissolved calcium salt, wherein dissolved calcium chloride with a concentration in the range of between 1 and 10 wt. % (based upon the total mass of the liquid hardening bath) is preferred. The solution of multi-valent cations is generally produced in that the corresponding salts are dissolved in deionized water or in tap water, to which a low molecular weight alcohol such as ethanol or isopropanal can be added, (a) in order to reduce the surface tension of the solution and therewith to facilitate the emersion of the discrete droplets produced at the nozzle, (b) adjusting the concentration the aqueous solution of the multi-valent cation containing salt (for example calcium salt), and/or (c) to influence the gelling of the capsule material (for example alginate).

Alternatively to introducing or dripping the discrete droplets into a solution of multi-valent cations, the fine droplets can also be sprayed with a solution of multi-valent cations.

As capsule materials, particularly suitable are alginate, that is linear co-polymers of -L-guluronate (G) and -D-mannuronate (M). The alginate chain can be envisioned as a block co-polymer, comprised of "G-blocks" (homopolymer regions of guluronic acid residues), "M-blocks" (homopolymer regions of mannuronic acid residues) and "MG-blocks" (copolymer regions of mixed alternating sequences of M and G) of variable length. Alginates exhibit, besides a variable chemical composition, also a broad molecular weight distribution, so that the concept alginate is a generic term encompassing an entire family of polymers. The characteristics of each respective alginate depend on its block structure and its molecular weight.

Above a critical molecular weight the characteristics of an alginate are essentially determined by its monomer composition and block structure. Generally, an increase of the content of guluronate leads to an increase in mechanically stable gels with elevated stability in the presence of non-, or as the case may be, anti-gelling ions such as sodium and magnesium as well as calcium complexing compounds; alginate gels with a high guluronate proportion possess in general an elevated porosity and tend during their gel formation only slightly towards syneresis. In comparison thereto, alginate gels become softer and more elastic by increasing the mannuronate proportion, and the corresponding gels shrink more strongly during their gel formation, which results in a reduction in porosity.

For the encapsulation of active substances (in particular flavor substances) in principle all alginate types are suitable; those with a mannuronate proportion above 40% are however preferred for the production of the microcapsules according to the invention for use in foodstuff applications, since they are comparatively elastic and exhibit small porosity, which has beneficial effects in flavor applications since they are comparatively elastic and exhibit low porosity, which is beneficial for flavor use in applications in which heat and therewith flavor retention during the further processing have an impact. On the other hand, in the case that an intentional continued release of a flavor substance out of the inventive capsules under the influence of heat, steam or air, is desired, that is, conditions as are present frequently in the case of tobacco products, guluronate rich alginates with large pores are preferred. Due to their comparatively rapid gelling high molecular alginates are preferred for the encapsulation of flavor substances. For modulating the viscosity of an alginate gel it can however be of advantage to substitute high molecular alginates partially with low molecular alginates; the viscosity of an alginate gel is responsible, besides other factors, for the size or magnitude of the microcapsules formed in accordance with the inventive process and for the capsule thickness (shell thickness). The viscosity of the alginate gel has, besides this, a direct influence on the elasticity of the formed capsule.

For hardening (gelling) of alginate calcium ions are preferred, and this in particular due to their high effectiveness, the low cost associated with their employment, and their non-toxicity. Other divalent metal ions such as those of zinc, copper, etc. can likewise be employed, likewise the ions of the di- or trivalent ions, aluminum, etc. As counter ions of calcium the salty and slightly bitter tasting chloride is preferred for cost reasons; acetate and/or lactate are however preferred for taste reasons. During the contacting of discrete droplets, which include alginate as the hardenable capsule material, with calcium ions, a skin of insoluble alginate gel immediately forms. Subsequently thereto, calcium ions slowly diffuse into the capsule shell. For droplets with a diameter of 100 to 5000 micrometers and an aqueous solution of 1 to 10 wt. % calcium chloride the optimal contact time is less than 1 minute, it could however in certain cases be longer and for example can be 100 minutes. If the flavor includes water soluble components, it is however of advantage to remove the formed capsules already after a short time out of the calcium bath, in order to prevent the transmission of water-soluble compounds into the bath, or at least to maintain this within acceptable limits. It is to be noted that the loss of water soluble flavor components out of an alginate capsule occurs significantly more slowly than the loss of corresponding aroma components out of a comparable microsphere; these losses with microspheres are described in the document WO 98/15191. The above comments with regard to calcium ions and alginate apply in appropriate manner to other pairings of an acid polysaccharide and mono- or multi-valent cations.

Although the attention has been focused primarily in particular on the various types of alginate and thereunder again in particular sodium alginate, for the production of the capsules according to the invention also other low esterified pectins or other acid polysaccharides can be employed, in particular to produce water insoluble, heat stable gel capsules.

The concentration of the acid polysaccharide (hydrocolloid) in the liquid mixture, from which the capsule (shell) is to be produced, lies preferably in the range of between 0.5 and 4 wt. %, based upon the total mass of the solution. Concentrated solutions are as a rule difficult to process, since they have a high viscosity. The polysaccharide solutions can have additives such as locust bean gum, saccharose, glycerine or propylene glycol, in order to improve the mechanical characteristics of the capsule (shell) material. Fillers such as for example oligosaccharides, maltodextrin, starches, gum arabic or cellulose derivatives (for example carboxymethyl cellulose) can be dissolved in the polysaccharide solution or be dispersed therein, in order to improve the barrier characteristics of the capsules, in that they fill the pores, which would otherwise be present in the open structure of the later formed gel.

The hardened capsules, or capsules in the process of hardening, can be separated from the suspension (capsules in ion containing solution) for example by filtration or centrifugation. The result is moist mononuclear filled microcapsules, to which can be added for example an anti-caking agent, in order to maintain a free flowing (pourable) product. The still moist product can be dried under atmospheric pressure or reduced pressure, in order to produce a capsule product with defined water content. In the same manner it becomes possible to adjust or tweak the mechanical stability of the microcapsules.

The inventive capsules have a volume of up to 65 $mm^3$; however particularly in the field of flavoring technology significantly smaller volumes are preferred. Preferred volumes lie in the range of between $4\times10^{-6}$ $m^3$ and $2\times10^{-9}$ $m^3$; these correspond in the case of precisely spherical shaped microcapsules to a diameter of between approximately 200 and approximately 1500 μm. Preferably, the volumes of the mononuclearly filled microcapsules according to the present invention lie in the range of between approximately $3\times10^{-7}$ $m^3$ and $3\times10^{-5}$ $m^3$; this corresponds in the case of spherical shaped microcapsules to a diameter in the range of approximately 400 to approximately 1200 μm.

The filler material for the inventive mononuclearly filled microcapsules contain flavor substances. The concept "flavoring substance" includes natural flavor substances, flavor substances identical to natural, artificial flavor substances, flavor extracts, reaction flavors and smoke flavors, according to European Union-Flavor-Guidelines 88/388/EWG.

A large number of flavors and flavor ingredients can be encapsulated with the process according to the present invention. The flavors include compounds such as menthol, natural extracts, essences, complex mixtures of extracts, essential (etheric) oils, oleo resins (a mixture of an essential oil and a resin) or reconstituted natural, true to natural or artificial flavors. The group of natural extracts, essences and oleo resins includes fruit essences, vanilla extract, paprika oleo resin, pepper oleo resin, cinnamon oil, oil of wintergreen, peppermint oil, bay or laurel oil, thyme oil, curled mint oil, cassia oil, citrus oil and the like. The group of reconstituted natural, natural-like and artificial flavors include apple, cherry, strawberry, peach as well as sausage, cheese, tomato, celery and butter flavor. These flavors can be employed individually or as mixtures, according to known processes. Depending upon their respective $\log K_{o/w}$ value the flavors and flavor ingredients can be incorporated in varying upper limit amounts in the inventive capsules (see the above remarks regarding degree of difficulty of encapsulation depending upon $\log K_{o/w}$). As particularly advantageous, it is to be pointed out or emphasized that also slightly volatile and amphiphilic or as the case may be water soluble flavor substances, as are key components for the reconstruction of fresh, fruity and plant notes, can be incorporated in sufficiently high amount in the inventive capsules and can be maintained therein even during the further processing of the capsules.

Filled microcapsules in accordance with the present invention, of which the filler material includes one or more flavor substances, are adapted for instant release of the flavor substance by mechanical opening (fracturing) of the polysaccharide capsule. The capsule does not interfere with eating. The person of ordinary skill would design the thickness and stability (rupture resistance) of the polysaccharide capsule (shell) depending upon the requirements of the intended employment; he would for this in particular select a suitable hardenable capsule material and employ plasticizers as necessary. In this manner it becomes possible to produce for example inventive filled microcapsules of which the filler material includes one or more flavor substances, and it can be incorporated for example in a foodstuff or consumable. During chewing of the foodstuff there would thus occur a spontaneous release of the flavor substance wherein, in contrast to the processes for flavoring of consumables known from the state of the art, none or only insignificantly small amounts of flavor substance are retained by the material of the microcapsule.

The inventive microcapsules are formulated to be heat stable and/or boiling or cooking stable and/or frying or deep frying stable. These terms have the meanings described above and make it clear that the microcapsules in accordance with the invention, in comparison to systems know in accordance with the state of the art, have a particularly good flavor retention in semi-solid or sold foodstuff products during cooking, baking, boiling, deep frying, frying, drying, extruding, microwave heating, etc. The microcapsules according to the invention protect the flavor substances contained therein in hot liquid products very well against decomposition and escape, and namely in particular during pasteurizing and/or sterilizing of products into which they are incorporated.

The person of ordinary skill in this art is capable of modifying or adapting the composition of many flavors in particular with respect to components of amphiphilic or hydrophilic nature to the capsule system, such that acceptable sensoric results can be achieved. In order to guard against loss of active substances of the amphiphilic or hydrophilic components characteristic for the respective flavor during hardening and drying of the capsules, the inventive process when using the conventional nozzle system, as described for example in EP 0 513 603 B1, or WO 93/02785 and the therein cited documents, is preferably so designed, that (a) the hardenable capsule material first comes into contact at the tip of the nozzle with the active substance contained in the filler material selected from the group of flavor substances and (b) during or as the case may be following the hardening of the hardenable capsule material the one or more aroma substances are not, or as little as possible, defused into the capsule surrounding the filler material. The person of ordinary skill is capable based on tests to determine suitable process parameters on the basis of the known or predictable distribution coefficients, which prevent or at least reduce the transition of flavor substances into the capsule material and beyond this into the hardening bath or the atmosphere.

It is possible for the person or ordinary skill to have in mind, at least essentially, the composition of the flavor contained in the filler material and the organoleptic profile thereof. Components such as for example isoamyl acetate ($\log P_{o/w}$=2.12), ethyl butyrate ($\log P_{o/w}$=1.73) and benzaldehyde ($\log P_{o/w}$=1.64), which are amphiphilic in nature and of which the water solubility significantly increases in this sequence, represent the respective characteristics or as the case may be typical components for banana, pineapple and cherry flavor. Production conditions targeted to conserve these flavors make it possible for the person of ordinary skill, within the framework of the present invention, to achieve an almost complete retention or preservation of these flavor substances in the dried microcapsules in accordance with the invention.

The retention of flavor substances such as isoamyl alcohol, of which the $\log P_{o/w}$ of 1.22 means a renewed elevation of the water solubility in comparison to the three above-mentioned substances, is maintained at least within acceptable boundaries using process conditions targeted thereto in accordance with the invention, while non-adapted manufacturing conditions would practically lead to quantitative losses.

Acetaldehyde, which is responsible for the fresh characteristic of various fruit flavors, has a $\log P_{o/w}$ of −0.16 compared to isoamyl alcohol and thereby exhibits yet again a significantly increased water solubility. Quantitative losses of this flavor substance can occur during hardening and drying if it was contained in dissolved form in the filler material.

Even retention of highly water soluble substances such as acetaldehyde can however be significantly increased by appropriate measures, in order also to retain within the core of the capsule the sensoric activity, for example by dispersion of solid flavor substances or simply water in oil emulsions, micellular systems or liposomes in a case of liquid flavors.

For applications which require heat processing of the final foodstuff, there are preferred in accordance with the invention free-flowing (pourable) microcapsules, dry on their outer side, with a water proportion of $\leqq$50 wt. % in the capsule shell based upon the mass of the capsule shell, in comparison to capsules with a water proportion in the capsule shell of $\geqq$50 Wt. %. In the case that the water proportion is $\geqq$50 wt. %, flavor substances can escape from the microcapsule in the heat along with the then surplus or excess free water steaming out of the microcapsule. Dry capsules, for example calcium hardened capsules with a water content of $\leqq$50 wt. % in the capsule shell, based upon the total mass of the capsule shell, can be hydrated only with difficulty, so that even a heat exposure in the presence of water does not immediately result in disruption of the active substance releasing system; this would be different in certain cases were the inventive capsules to have a higher water proportion of, for example $\geqq$50 wt. % in the capsule shell, and also in microspheres known according to the state of the art, which include flavors embedded in a matrix, which when heated in the presence of water are less stable than the preferred inventive microcapsules, which have a water proportion of $\leqq$50 wt. % in the capsule shell; in the case of capsules with a filler material proportion of 80 wt. % and a capsule shell proportion of 20 wt. %, respectively, based upon the total mass of the capsule, the water proportion corresponds to less than 10 wt. % based upon the total mass of the capsule.

According to a preferred process design two-phase discrete droplets are dripped into a hardening bath, wherein the impacting of the droplets is cushioned or reduced to the extent possible, in order following hardening of the capsule (shell) material to produce a centered core (of filler material). The person of ordinary skill in the art would, in order to accomplish this, reduce the distance between the multi-nozzle system and the hardening bath and/or would in a first step spray the discrete droplets with the hardening solution while they are still falling, before the droplets submerge in the hardening bath and/or would modify the amplitude and frequency of a conventional vibrator associated with the multi-nozzle system and/or would adapt the intrinsic characteristics of the capsule shell and liquid core phase and/or would use certain overflow funnel systems or channel systems and/or would employ tension reducing compounds in the hardening bath, which would produce a foam upon the surface of the hardening bath or would reduce the surface tension of the hardening bath.

The polysaccharide solution forms a solid skin about the core material (filler material) immediately upon contact with the multi-valent cations. Thereafter the cations slowly diffuse out of the hardening bath (the hardening spray) into the internal of the capsule shell, so that a hardening gradient forms, wherein at the outer side of the capsule shell a comparatively high hardness and on the inner side of the capsule shell a comparatively low hardness exists (see also below). The person of ordinary skill would determine on the basis of tests at which point in time in the hardening process the gelled microcapsules are to be removed from the hardening bath.

If amphiphilic flavor substances are employed, it is to be expected that the hydrophilic compounds within a flavor substance mixture would be those which would be first to diffuse out of the core phase (filler material phase) into the aqueous polysaccharide solution, while the discrete droplets following exiting the multi-nozzle jet are just forming, and in a second step diffuse through the capsule shell which is in the stage or process of hardening and diffuse in the direction towards the hardening bath. The droplet forming and the hardening steps are thus preferably carried out in the shortest possible time in accordance with the invention. It is known that polysaccharide solutions based upon alginate, gellan or pectin, in contact with multi-valent cations such as for example calcium, form an inhomogeneous structure. The cations attach initially only to the outer surface of the outer polysaccharide phase of the mentioned discrete droplets and diffuse subsequently towards the center wherein they develop a so-called gel gradient. The capsule shell strength is thus greater on the outer surface of the already formed microcapsule than inside, and in the inner part of the gel phase this is liquid or of soft consistency. The molecular chains of the hardening hydrocolloid are contracting, wherein simultaneously a certain amount of water is pressed or extruded out of the gel. This phenomenon is known as the syneresis effect, and the shorter the gel time, the smaller the syneresis effect. Depending upon factors such as gel time, the polysaccharide solution concentration, and the cation solution concentration, the syneresis can make a difference of between 5 wt. % and 60 wt. %, based upon the mass of the original liquid droplet. A certain amount of hydrophilic flavor substance can escape in this manner (by syneresis) and along with the accompanying water be transported into the hardening bath. According to a preferred embodiment of the present invention the gellation time, that is, the contact time between the formed polysaccharide phase of the capsule and the bath with multi-valent cations, is reduced to a minimal value, which preferably is less than 1 minute and in particular in the range of between 5 and 30 seconds. The inhomogeneity of the formed gel and the reduced syneresis effect attenuate the migration of the saturated hydrophilic flavor substance out of the core phase (filler material) through said gel phase into the hardening bath. This is an important point of distinction in comparison to the above described microcapsules which are produced by coacervation and of which the contact time between the forming microcapsules and the aqueous reaction bath is in the realm of hours or even days.

The isolation or removal of the formed microcapsules out of the hardening bath is preferably carried out continuously, and namely preferably by means of a sieve technique or by centrifugation. At the time point of separation from the hardening bath the microcapsules are in a wet state. The water content of the moist microcapsules lies between 50 and 90 wt. %, based upon the total mass of the particle. The water exists both as water bound to the polysaccharide as well as free water within the porous structure of the polysaccharide gel, and as interstitial water between the formed microcapsules. The water still contains a not insignificant concentration of multi-valent cations. According to a preferred embodiment, following separation of the moist (wet) microcapsules from the solution of multi-valent cations (hardening bath) a washing step is carried out. For this, a washing solution is employed, which is preferably comprised of deionized water, however may be a mixture of water and an organic solvent such as for example ethanol or isopropanol. The washing step is preferably integrated into the separating step, wherein a spray nozzle for application of a washing solution is incorporated in the separating device employed for separating. In this manner the multi-valent ions, which are still present in the interstitial water of the microcapsules and in the outer part of the polysaccharide gel, can be rapidly washed out. This prevents a further diffusion of the reactive multi-valent cations into the polysaccharide gel and prevents thus also a further syneresis effect. Microcapsules which are subjected to a process with a short gelling time can still loose up to 50 wt. % on the basis of the syneresis effect, in the case that the microcapsules are left standing unwashed following separation from the hardening bath.

Due to the tendency of the hydrophilic flavor substances to exit out of the inner phase (core; filler material) of the moist microcapsules through the porous polysaccharide gel structure of the capsules (shell) material, in accordance with a preferred embodiment of the present invention the still moist microcapsules are converted as rapidly as possible into the dry form. The drying process leads thereto, that the porous shell structure of the microcapsules further contracts until a point at which even the hydrophilic flavor substances can hardly diffuse through the dried capsule shell matrix. The drying can either be carried out in a batch or continuously, wherein however a continuous process design is preferred, in order to shorten the time span between the above described washing of the moist microcapsules and the drying step. Each standing time of the moist microcapsules can lead to a further syneresis and therewith to a further transport of hydrophilic flavor substances out of the microcapsules.

In the framework of the present invention the conventional drying processes can be employed, for example with use of conductive dryers (such as standard ovens or vacuum ovens) or convective dryers (for example whirlwind dryers with rotating dryer). These techniques are however suited when primarily or even almost exclusively lipophilic and non-volatile flavor substances are contained in the filler material (core). When, in comparison, water soluble or slightly volatile flavor substances are to be encapsulated, then an important part of these materials can vaporize with a simply water evaporation, an effect, which is critical in particular in the case of convective drying processes, in which a particularly high proportion of flavor substances can be removed from the filler material, since vaporizable substances are continuously transported away via the air stream. In a preferred design of the present invention the said drying techniques are employed in a predrying step, in which the water content of the capsule shell material remains high and therewith the sympathetic (i.e., along with the water) evaporation of hydrophilic flavor substances remains tolerable or acceptable. Wet microcapsules frequently have a water content, which lies between 96 wt. % and 65 wt. %, based upon the total mass of the capsule shell material. With the pre-drying preferably less than 25% of the total water to be removed is evaporated. In such a manner flavor substances with a $\log K_{o/w}<2$, in particular $\log K_{o/w}<1.5$ are particularly effectively encapsuled.

According to a further alternative embodiment of the present invention a drying technique is employed, in which the preferably washed moist microcapsules or the saturated dried microcapsules are contacted with a water adsorbing or water bonding substance. As water absorbing or water bonding substance, preferably an organic salt such as for example magnesium carbonate, magnesium sulfate, calcium chloride, is employed, or compounds such as silicon dioxide, zeolite or starch. Preferred in many cases is a silicon dioxide, which preferably has an internal specific surface area of 150 $m^2/g$ or more. The water up-take capacity of such a silicon dioxide (also referred to as silica) should be greater than 100% and preferably above 200%, based upon its own mass. First the still moist or predried microcapsules are conventionally homogenously mixed with up to 50 wt. % and preferably approximately 25 wt. % of the said silica. For mixing, a drum mixer, spiral mixer, paddle mixer or plow share mixer can be employed. Following a mixing time, which should not exceed 10 minutes and is preferably approximately 5 minutes, the microcapsules are separated from the loaded water adsorbing or bonding substance using a sieve technique. For this, vibrating or rotating sieves can be employed. The mixing and sieving can either be carried out in a batch or as a continuous process. The capsule shell material of the dried microcapsules has a water content of maximally 50 wt. %, based upon the mass of the capsule shell. The advantage of such a drying process in comparison to the above mentioned standard drying techniques is in particular in (a) a shorter process time, (b) the absence of a flavor substance emission in the air, (c) the good flow ability of the dried microcapsules even with high flavor loading and, in particular, (d) in the improvement with respect to the water soluble and volatile flavor substance component or proportion. Flavor substance with a $\log K_{o/w}<2$ and in particular $\log K_{o/w}<1.5$ are significantly better encapsulated than when using the conventional drying techniques. The improvement with respect to the retention can be as much as 50 to 90 wt. % based upon the starting mass of the employed flavor components in the filling material, see Example 10.

The inventive microcapsules have a water proportion in the capsule shell of ≦50 wt. %, based upon the total mass of the capsule shell. A substantial reason therefore is that internal research has shown that microcapsules with a higher water proportion in the capsule shell lose an unacceptable high proportion of their highly volatile and their water soluble flavor substances when they are heated within their foodstuff matrix. The more water soluble and volatile compounds are entrained in the evaporating water and transported out of the microcapsules, so that this can be referred to as co-distillation. The thermal stability of the inventive microcapsules with a water content of ≦50 wt. % in the capsules shell is based not alone on its physical integrity, on the basis of its water insolubility, and its irreversible gel formation. It is based also and not least thereupon, that the flavor profile of the original encapsulated flavor system is conserved in unchanged formal composition. An inventive microcapsules with a filler material, which has a proportion of at least 80 wt. %, based upon the total mass of the dried capsule, and of which the capsule shell material is accordingly a proportion of at most 20 wt. %, should generally have a water content of not more than 10 wt. %, again based upon the total mass of the dried microcapsules. In the case of a filler material proportion of 90 wt. % the water content should not be above 5 wt. %.

The invention is described in greater detail in the following on the basis of examples.

EXAMPLE 1

Process for producing inventive (standardized) capsules for use in Examples 2 through 50.

Sodium alginate (type Protonal LF20/60), FMC BioPolymer, Drammen, Norway) was dissolved in demineralized (deionized) water with stirring (15.0 g alginate for 1000 ml water), until a clear solution is produced. The stirring time at a water temperature of 8-15° C. was approximately 30 minutes. The solution was allowed to rest at least 3 to 5 hours prior to processing in order to obtain the desired viscosity of maximally 200 mPa·s, better yet since the previous day; solutions which are older than 24 hours are no longer usable. After the stirring process the pH of the solution was measured and in certain cases set to pH 6.5-7.5 with base. Tank A was filled with this solution.

A selected flavor concentration or an essence was mixed with neutral oil (for example Miglyol, CONDEA Chemie GmbH, Witten, Germany) or a commercially available plaint oil (for example soy bean oil) for producing a solution or dispersion with a defined degree of dilution; this dilute flavor solution was supplied to Tank B and continuously stirred to avoid demixing. Both solutions were separately pumped via pressure lines to a conventional double nozzle system which was vibrating, wherein the flavor solution was supplied to the internal nozzle with a diameter of 200 micrometer, the alginate solution was supplied to the outer nozzle with a diameter of 1000 micrometer. The flow rate relationship of the two solutions was controlled using two separate pressure lines in such a manner that the relationship of the liquid A:B of 10:1 was achieved.

Standard Parameters:

Internal nozzle 0.3 bar/flow-through 14.0=330 g flavor per hour

Outer nozzle 0.5 bar/flow-through 20.0=3300 g alginate per hour

Frequency=160 Hz, amplitude=4.8

Therewith, a two-phase liquid droplet with an average particle diameter of approximately 2.2 mm was obtained with a weight relationship of shell to core of 10:1. By gelling with 10% calcium chloride solution these droplets were gelled during 5 minutes (solution of 10 g anhydrous calcium chloride in 100 g demineralized water).

Due to syneresis during the gelling of the alginate, one obtained a moist capsule with a diameter of approximately 1.6 mm, with flavor core diameter remaining unchanged. The particles are isolated by filtration and briefly washed with tap water for removal of surplus calcium ions. The filtered and washed particles are dried in a fluidized bed with an air temperature of 50° C. and an air amount of 10 $m^3$/min, wherein the average particle diameter of the particles dried by means of this standard drying method was reduced to 1050 micrometer. For supporting the fluidizing of the wet and, at this time, also sticky capsules, 1% magnesium carbonate was added as flow aid material. The average particle diameter, which could most easily be measured by light microscopy and for which a statically significant member of capsules was determined, exhibited a model distribution, the capsule diameter was determined to be 1050±100 micrometer. Alternatively a laser bending method (Malvern) was employed for particle size and particle distribution measurement.

The resulting dry standard capsules exhibited on average a core portion of a 80 wt. % and a shell portion of 20 wt. %, wherein the shell had an average residual water content of 50%, as determined using a drying process with a halogen dryer.

The dilution of the flavor concentrate with oil in the core of the capsule was so selected, that in comparative tests with use of a flavoring by means of (a) the corresponding liquid flavor concentrate or (b) a spray dried form, in use the same mass proportion of flavor was respectively employed. Therein care was taken that in the flavorizing with capsules, respectively, a dosing was adjusted or set at between 0.2 and 2.0 wt. % capsules, depending upon the end use and the desired release rate, in order to obtain a uniform image. The (comparative) flavorization by means of liquid flavor concentrate occurred according thereto on a basis of the employed dilution of the corresponding flavor concentrate in capsules and the supplemental dilution by encapsulation of the shell portion of partial dried alginate gel. In the employment of varying capsule sizes the changed dilution and dosing were given appropriate consideration.

This type of capsule product was employed in the following examples.

EXAMPLE 2

Chewing gum was produced in accordance with the following formulation.

Formulation type: chewing gum, sugarfree

TABLE 1

| Chewing Mass | | |
|---|---|---|
| Additive | Raw Material/ Ingredient | Wt.-% |
| 01 | Chewing Gum Base | 27.62 |
| 02 | Xylitol | 9.87 |
| 03 | Sorbitol | 48.59 |
| 04 | Mannitol | 11.54 |
| 05 | Glycerin | 2.16 |
| 06 | Aspartam | 0.11 |
| 07 | Acesulfam K | 0.11 |
| | | 100.0 |
| | Flavoring: | Wt.-% (based upon the total mass of the chewing mass) |
| 08a | Capsules - Peppermint Oil | 1.0* |
| 08b | Capsules - Peppermint Oil | 2.0** |
| 08c | Peppermint Oil | 0.64 |

*corresponds to a peppermint oil portion of 0.64% at an adjusted average capsule size of 1050 micrometer and a flavor dilution with oil of 80:20.
**corresponds to a peppermint oil portion of 0.64% at an adjusted average capsule size of 800 micrometer and a flavor dilution with oil of 80:20.

Production Method a—mixing of 1, 2, 3, 4, 5, 6, 7.

b—kneading the mass at a temperature of 50° C. until mixture is homogenous.

c—addition of flavor (0.64% ingredient 08c or as the case may be 1.0% ingredient 08a or as case may be 2.0% ingredient 08b) based upon chewing gum mass (total mass of ingredients 1 through 7).

d—laminating the mass e—cutting into strips

The chewing gum strips were evaluated for fragrance (aroma by sniffing) and taste (chewing gum in the mouth). The result of the organoleptic tests (6 test persons) represented in Table 2 showed that the encapsulated aroma with both capsule sizes exhibited significantly higher intensity in comparison to the liquid aroma with the same mass proportion.

TABLE 2

| | Particle | Intensity of the Aroma | |
|---|---|---|---|
| | Size (mm) | Olfactory | Oral |
| Alginate capsule (additive 08a) | 1.050 | 5.25 | 7.00 |
| Alginate capsule (additive 08b) | 0.800 | 6.38 | 8.40 |

TABLE 2-continued

| | Particle Size (mm) | Intensity of the Aroma Olfactory | Oral |
|---|---|---|---|
| Non-Encapsulated (additive 08c) | | 4.50 | 4.70 |

Organoleptic evaluation (flavor strength/intensity):
0 = not discernable,
1 = almost imperceptible,
2 = very weak, flavor type hardly recognizable;
3 = weak, flavor type just barely recognizable;
4 = weak, flavor type clearly recognizable;
5 = acceptable, somewhat too weak;
6 = acceptable, optimal flavor strength;
7 = acceptable, light to strong;
8 = flavor much too strong;
9 = flavor extremely strong, irritating.

EXAMPLE 3

Baking

Biscuits (cracker) were produced in accordance with the following formula.

Formula type: snack biscuit, cheese, salted

TABLE 3

| Additive | Raw Material/Ingredient | Wt.-% |
|---|---|---|
| 01 | Wheat Flour (Cracker type) | 66.530 |
| 02 | Vegetable Shortening | 7.980 |
| 03 | Raw Sugar | 1.550 |
| 04 | Inverted Sugar Syrup | 1.550 |
| 05 | Salt | 1.150 |
| 06 | Ammonium Bicarbonate | 0.890 |
| 07 | Malt Syrup Extract | 0.806 |
| 08 | Sodim Monophosphate | 0.665 |
| 09 | Sodium Bicarbonate | 0.550 |
| 10 | Citric Acid | 0.066 |
| 11 | Bacterial Protease | 0.027 |
| 12 | Sodium Metabisulfite | 0.016 |
| 13 | Water | 19.370 |
| | | 100.0 |

| | Flavorization: | Wt.-% (based upon the total mass of the additives 1-13) |
|---|---|---|
| 14a | Capsules - Cheese flavor | 1.0* |
| 14b | Capsules - Cheese Flavor | 2.0** |
| 14c | Cheese Flavor, top note, liquid | 0.08 |

*corresponds to a cheese top note proportion of 0.08% with an adjusted average capsule size of 1100 micrometer and a flavor dilution with oil in the core of 10:90
**corresponds to a cheese top note proportion of 0.08% with an adjusted average capsule size of 900 micrometer and a flavor dilution with oil in the core of 10:90

Production Method a—mixing 2, 3, 4, 5 and 13 (70° C.), until all components are dissolved.

b—addition of ingredients 1 and 6-12 to the dough, addition of flavor 14a or as the case may be 14b or as the case may be 14c.

c—mixing for approximately 10 minutes, until the dough is flat d—storing the dough for 2 hours e—laminating the dough and cutting to size f—addition of granulated salt on the cracker dough (optional)

g—baking for 4 minutes in an oven at 185° C. (at the beginning the temperature should be 210° C.). Injection of steam while the crackers are introduced into the oven, this injection being carried out so long until the temperature reaches 190° C.

h—during removal of the crackers vegetable fat is sprayed on the crackers (optional), until the crackers have achieved a certain shininess.

The crackers were evaluated for fragrance (aroma by sniffing) and taste (cracker in the mouth). The results of the organoleptic testing (7 test persons), presented in Table 4, showed that that the encapsulated aroma of both capsule sizes exhibited a significantly higher intensity in comparison to the liquid aroma with the same mass proportion.

TABLE 4

| | Particle Size (mm) | Intensity of the Aroma Olfactory | Oral |
|---|---|---|---|
| Alginate capsule (additive 14a) | 1.100 | 5.40 | 7.00 |
| Alginate capsule (additive 14b) | 0.900 | 5.80 | 8.40 |
| Non-Encapsulated (additive 14c) | | 4.50 | 3.88 |

Organoleptic evaluation (flavor strength/intensity):
0 = not discernable,
1 = almost imperceptible,
2 = very weak, flavor type hardly recognizable;
3 = weak, flavor type just barely recognizable;
4 = weak, flavor type clearly recognizable;
5 = acceptable, somewhat too weak;
6 = acceptable, optimal flavor strength;
7 = acceptable, light to strong;
8 = flavor much too strong;
9 = flavor extremely strong, irritating.

EXAMPLE 4

Deep Frying

A panade (for bread crumb encrusted product) was produced in accordance with the following formula:

Recipe Type: Wet Panade

TABLE 5

| Additive | Ingredients | Wt.-% |
|---|---|---|
| 01 | Chicken breast in pieces, approximately 15 g | 76.0 |
| 02 | Salt | 1.00 |
| 03 | Wet panade, BAB 137* | 5.80 |
| 04 | Water | 10.2 |
| 05 | Dried panade, Panko 102* | 7.00 |
| | | 100.0 |

| | Flavoring: | Wt.-% (based upon the total mass of additives 1-5) |
|---|---|---|
| 06a | Flavor, carrot, liquid | 0.16 |
| 06b | Flavor, carrot, capsules | 1.0** |

**corresponds to a carrot flavor proportion of 0.16% at a capsule size of 1050 micrometer and a flavor dilution with oil in the core of 20:80.
*Griffith Laboratories, B-2200 Herentals Production Method a—wet panade (03) and salt (02) dispersed in water, allowed to swell b—flavor (06a or 06b) is dispersed in the swollen wet panade described in a)

c—meat is added to the flavorized wet panade d—allowing to drip, and rolling in dry panade (05)

e—deep frying the panaded meat pieces in vegatable fat, approximately 180° C., approximately 4 minutes.

The deep fried chicken breast pieces were sampled for fragrance (aroma by smelling) and taste.

TABLE 6

| Application: Chicken Nuggets Flavor: Carrot | | | | | |
|---|---|---|---|---|---|
| | Aroma- | Taste Profile | | | Dosing |
| # | Type | Profile 1 | Profile 2 | Profile 3 | In Wt.-% |
| 06a | Liquid Flavor | Weak Carrot | Slightly Cabbage | Weakly Green | 0.16 |
| 06b | Capsule | Typical Carrot | Sweet | Cabbagy | 1.0 |

EXAMPLE 5

Steaming, Deep Frying

The noodles were produced in accordance with the following formula.

Formula type: Instant, Asiatic

TABLE 7

| Additive | Ingredient | Gram |
|---|---|---|
| 01 | Wheat flour | 1000 |
| 02 | Water | 250 |
| 03 | Salt | 13 |
| 04 | MSG | 1.2 |
| 05 | Kansui*** | 1.2 |
| 06 | Guar Gum | 0.4 |
| | | 1265.8 |

| | Flavorizing: | Wt.-% (based upon the total mass of ingredients 1-6) |
|---|---|---|
| 07a | Leek aroma, capsules | 1.0%* |
| 07b | Leek aroma, spheres | 1.0%** |
| 07c | Leek aroma, spraydried Product (20 parts flavor, 80 Parts Maltodextrin/ Gum Arabicum) | 0.25% |

*correspondes to a leek flavor portion of 0.05% - corresponding to 0.25% of the corresponding spraydried product - with an adjusted capsule size of 1050 micrometer and a flavor dilution by oil in the core of 5:95%.

**corresponds to a leek flavor portion of 0.05% - corresponding to 0.25% of the corresponding spraydried product - at an adjusted sphere size of 500 micrometer and an embedded flavor content of 5%.

**alkali solution (imparts to the noodles a fresh, light tingling sour taste) comprised of:

| | | |
|---|---|---|
| 05a | calcium carbonate | 0.96 |
| 05b | sodium carbonate | 0.12 |
| 05c | sodium polyphosphate | 0.12 |

Production Method a—mixing and pressing: ingredients 01-07 are blended in a dough kneader. The result is a crumbly mass, which is pressed together on a plate with a noodle wood (roller).

b—5 minutes allowing to rest c—rolling out the dough: a dough plate was extruded ever thinner using a domestic noodle machine between two rollers, maximal 1.1 mm.

d—cutting the noodles (the extruded dough plate was pressed between two rippled rollers on a perforated sheet in fine noodle rods.

e—steaming (the whole sheet with the noodles were cooked in a steamer for 3 minutes at approximately 4 bar at 100-110° C. not fully cooked (instant characteristic of the noodles)

f—deep frying g—the noodles were deep fried for 50 seconds in hot palm oil at 155-160° C. Subsequently the surplus oil was allowed to drip off, the noodles were cooked and packed—by deep frying the noodles became more crunchy, more flavorful and more durable and storage stable.

The noodles were evaluated for fragrance (aroma by sniffing) and taste (in the mouth). The results of the organoleptic testing (7 test persons) are presented in Table 8, and show that the encapsulated flavor, in comparison to the spray-dried flavor at the same dose, always had a significant perceptibility and recognizability, while the spray-dried flavor and the flavor encapsulated in spheres practically was no longer recognizable.

TABLE 8

| | Capsules | Spheres* | Non-Encapsulated Spraydried Product |
|---|---|---|---|
| After Pressing | Onion, green, clearly-like leeks | Weaker than capsules | Slightly-like leek, extremely weak |
| Following Cutting | Green, leek, weaker than dough sample | Too weak | Lightly oniony, weak |
| Following steaming | Light leek, green weak however recognizable | Too weak | Too weak |
| Finished Noodles | Slightly like leek | Too weak | Too weak |

*Matrix embedded aroma (spheres) were here tested in comparison to capsules, in order to represent the differences between capsules (co-extruded) and spheres (flavor emulsified, extruded).

EXAMPLE 6

Drying with Silicon Dioxide 15 g sodium alginate (type Protanal LF20/60, FMC Biopolymer) were dissolved in 985 g demineralized water using a high speed kneading mixer of the type Ultra-Turrax until the aqueous solution became clear. The alginate solution was prepared several hours prior to its use, in order to enable a complete hydration of the alginate chains. 2 g leek flavor concentrate were dissolved in 98 g neutral oil (type Miglyol, CONDEA Chemie GmbH). The two solutions were separately supplied by means of gear wheel pumps out of two supply tanks to a vibrating two-stream nozzle head. The nozzle head system included an inner nozzle with 150 μm diameter and an outer nozzle with 1000 μm diameter. The flow rate of the two solutions was so adjusted that it formed a laminator flow out of the nozzle, 400 g per hour flavor solution (leek) through the inner nozzle and 2800 g per hour alginate solution through the outer nozzle. The vibration thereof was so adjusted that it interrupted the stream and formed homogeneous discrete droplets. At a frequency of 130 Hz two-phase droplets of approximately 2 mm diameter were formed. The droplets fell into a 10% calcium chloride reaction bath, so that immediately a solid layer formed around the liquid filler material. The calcium bath reactor was comprised of a pipe system, through which the calcium chloride solution flowed and so continuously transported the fresh gelled capsules to a separator. The flow rate of the pump for the calcium chloride solution was adjusted to a gelling time of approximately 1 minute. The gelled capsules were transported through a pipe reactor and then separated on an 800 μm sieve. The sieved capsules were washed with tap water. The wet capsules had, due to syneresis which occurred during the gelling step, a diameter of only approximately 1.6 mm, with a water content of the shell material of 98%. 520 g of wet capsules wet capsules were obtained and these were mixed for 10 minutes with 260 g silicon dioxide (Sipernat S50, Degussa) and then separated from the silicon dioxide on a vibrating 800 μm round sieve. 120 g dried capsules with a particle size of 1.2 mm were produced. The water content of the shell material of the dried capsules was 49%. The dried microcapsules included, at a total 83 wt. % liquid filler material, a water content of 8.4 wt. %.

EXAMPLE 7

Predrying Plus Drying with Silicon Dioxide 15 g sodium alginate (type Protanal FL 20/60, FMC Biopolymer) were dissolved in 975 g demineralized water using a high speed kneading mixer of the type Ultra-Turrax. 50 g strawberry flavor and 1 g polyglycerol ester (type PGRP 90, Danisco Cultor) were dissolved in 39 g neutral oil, 10 g tap water were added, then slowly mixed for approximately 5 minutes and subsequently homogenized for 1 minute with a high speed kneading mixer of the type Ultra-Turrax in order to produce a stable water-in-oil emulsion. The two solutions were supplied to a vibrating two-stream nozzle head with an inner diameter of 150 μm and an outer diameter of 1000 μm. The flow rates were adjusted for the flavor solution to 300 g per hour and for the shell solution to 3000 g per hour, the vibration frequency to 180 Hz. Two-phase droplets of approximately 1.8 mm diameter were formed. The droplets fell in a 10% calcium chloride reaction bath. The flow rate of the pump for the calcium chloride reaction bath was adjusted to a gelling time of approximately 1 minute. The gelled capsules were separated on a 800 μm sieve and washed. The wet capsules had a diameter of 1.7 mm and a water content of the shell material of 97%. 605 g wet capsules were obtained and pre-dried for purposes of pre-drying in a fluidized bed dryer (type STREA 1, aromatic) with an air flow of 100 $m^3$ per hour and an inlet temperature of 50° C. for approximately 10 minutes. 490 g pre-dried capsules were obtained, mixed with 200 g silicon dioxide (Sipernate S50, Degussa) for approximately 5 minutes and then separated on a vibrating 800 μm round sieve. 140 g dried capsules with a particle size of 1.1 mm were produced. The water content of the shell material was 49%. The total microcapsule included 79.1% liquid filler material, the water content was 10.2%.

EXAMPLE 8

Drying with Silicon Dioxide 15 g sodium alginate (type Protanal LF 20/60, FMC Biopolymer) and 10 g gellan gum (type Kelcogel, Kalco) were dissolved in 975 g demineralized water using a high speed kneading mixer of the type Ultra-Turrax. 500 g of a peppermint flavor solution was prepared. The two solutions were supplied to a vibrating two-stream nozzle head with an internal diameter of 200 μm and an outer diameter of 500 μm. The flow rates were adjusted to 500 g per hour flavor solution and 800 g per hour shell solution, the vibration frequency was adjusted to 200 Hz. Two-phase droplets of approximately of 1.4 μm diameter were formed. The droplets fell into a pipe reactor with 5% calcium chloride solution. The flow rate of the pump for the calcium chloride reaction bath was adjusted to a gel time of approximately 10 seconds. The gelled capsules were separated on an 800 μm sieve and washed. The wet gel capsules had a diameter of 1.2 mm and a water content of the shell material of 96.5%. The objected 1100 g wet capsules were mixed with 275 g silicon dioxide (Sipernat S50, Degussa) for approximately 10 minutes and then were separated for the silicon dioxide on a vibrating 800 μm round sieve. An amount of 540 g dried capsules with a particle size of 0.9 mm were produced. The water content of the shell material was 4.6%. The total microcapsule comprised 93.1% liquid filler material, the water content was 3.2%.

EXAMPLE 9

Continuous Gelling Process; Short Gel Time

This example served to demonstrate the improvement which can be achieved with reference to the flavor component encapsulation in alginate microcapsules when the gelling process is carried out as a continuous 1 minute process, in comparison to the encapsulation techniques carried out as a batch process, in which the gelled capsules remain in contact with the gel bath for hours.

50 g sodium alginate were dissolved in 195 g demineralized water using a high speed kneading mixer of the type Ultra-Turrax. 250 g Model-flavor were dissolved in 750 g neutral oil. The Model flavor was comprised of flavor components, which cover a large spectrum of water/oil solubility as indicated by log$K_{o/w}$-values, see the following Table 9.

TABLE 9

| Component | Amount % (w/w) | Log $K_{o/w}$ |
|---|---|---|
| Anisyl alcohol | 5 | 0.95 |
| Ethylpropionate | 5 | 1.24 |
| Benzaldehyde | 5 | 1.64 |
| Isoamylacetate | 5 | 2.12 |
| Ethylcaprylate | 5 | 3.9 |

The two solutions (alginate, flavor) were conveyed to a vibrating two-stream nozzle head with an inner diameter of 150 μm and an outer diameter of 500 μm. The flow rates were adjusted for the flavor solution to 500 g per hour and for the shell solution to 1000 g per hour, the vibration frequency was adjusted to 200 Hz.

For the preferred short continuous gelling process the formed discrete droplets fell into a pipe reactor, which was filled with 5% calcium chloride, and were so transported, that the dwell time was 1 minute. The resulting wet capsules were sieved and washed with tap water.

The results of the 1 minute capsule production (corresponding to 8.3 g encapsulated flavor solution) were then dissolved in 200 ml 1% aqueous sodium chloride solution. The mixture was then extracted for 4 hours in a perforator with diethyl ether. The diethyl ether extract was analyzed using HRGC/MS. The results were evaluated based on the surface of the GC/MS peaks for the components per gram of encapsulated aroma solution.

For the batch gelled process the formed discrete droplets fell into a 5% calcium chloride containing reactor with a dwell time of 2 hours. The formed wet capsules were thereafter sieved and washed with tap water. The same analytical protocol was carried out as for the short gel time process.

10 g Model-flavor solution were dispersed in 200 ml 1% aqueous sodium citrate solution. The mixture was extracted in a perforator for 4 hours with diethyl ether and evaluated as described above.

The flavor retention for the respective flavor components during the short continuous gelling process and the long gel batch process were calculated on the basis of the amount of the Model-flavor solution which originally flowed through the nozzle system and theoretically was encapsulated, the results are presented in Table 10.

TABLE 10

| Flavor Retention: | | |
|---|---|---|
| Components | Short Gel Time (continuous) | Long Gel Time (Batch) |
| Anisyl alcohol | 60% | 6% |
| Ethylpropionate | 61% | 0% |
| Benzaldehyde | 82% | 11% |
| Isoamylacetate | 80% | 18.5% |
| Ethylcaprylate | 90% | 90% |

In the process with short gel time the flavor retention of the substances with a $\log K_{o/w}$<3.9 was significantly better than in the process with longer gel time.

EXAMPLE 10

Comparison of Various Drying Processes

This example served to demonstrate the differences with regard to flavor retention which exist between conventional convective drying processing (fluidized bed dryer) and the drying process using water adsorbing substances.

A sample of the wet capsule product, produced according to the process with short gel time as described in Example 4, was divided following washing into two equal batches of 200 g.

The first batch was dried by addition of 100 g silicon dioxide to the wet capsules. The substances were mixed for 10 minutes and the then dried capsules were subsequently manually separated from silicon dioxide on an 800 μm-sieve. 60 g dried capsules were obtained. The water content of the shell material of the dried capsules was 45% (corresponding to 7% water content and 84.2% liquid filler material based upon the mass of the total capsules).

The second 200 g batch was dried in a fluidized bed dryer (type STREA 1, Aeromatic) at 30° C. in the temperature and 100 $m^3$ per hour air flow, in order to obtain an amount of dried capsules of 60 g. The water content of the shell material of the dried capsules was 62% (corresponding to 14.4% water content and 76.8% liquid filler material based upon the mass of the total capsule).

The varying amounts of liquid filler material, which were found in the two dried capsule types, show already the difference with regard to the flavor retention, which are associated with the two drying processes. The silicon dioxide dried capsules had 50.52 g (84.2%) liquid filler material, those capsules dried in the fluidized bed had in comparison only 46.08 g (76.8%) liquid filler material.

The details of the retention of each flavor component is shown in the following Table 11. The used analytical method was identical with that described in Example 9.

TABLE 11

| | Drying "water adsorbing" Substances: % Retention | Convective Drying: % Retention |
|---|---|---|
| Anisyl alcohol | 33% | 5% |
| Ethylpropionate | 50% | 4% |
| Benzaldehyde | 80% | 52% |
| Isoamylacetate | 95% | 60% |
| Ethylcaprylate | 0% | 65% |

EXAMPLE 11

Influence of the Water Content in the Shell on Heat Stability

This example underscores the importance of the water content present within the shell material of the dried capsule in order to achieve an efficient heat stability of the encapsulated flavor during a heating process.

Capsules with cheese flavor were added to a cracker dough and then baked. The capsules had various water content (various degrees of drying). The flavor dosing was maintained constant for all tests.

The crackers were prepared according to the following formula (Table 12):

TABLE 12

| | Additive | Amount (%) |
|---|---|---|
| 1 | Vegetable Fat | 7.98 |
| 2 | Industrial Sugar | 1.55 |
| 3 | Fructose Syrup | 1.55 |
| 4 | Salt | 1.15 |
| 5 | Wheat Flour (cracker type) | 66.53 |
| 6 | Ammonium bicarbonate | 0.89 |
| 7 | Malt extract syrup | 0.806 |
| 8 | Sodium Monophosphate | 0.665 |
| 9 | Sodium Bicarbonate | 0.55 |
| 10 | Citric Acid | 0.066 |
| 11 | Bacterial Protease | 0.027 |
| 12 | Sodium Metabisulfite | 0.016 |
| 13 | Water | 19.37 |

Cracker Preparation Process

1. Mixing the ingredients 1, 2, 3, 4 and 13 (70° C.) until they are completely dissolved.
2. Adding 5-12 and the desired amount of capsules into the dough.
3. Mixing for approximately 10 minutes.
4. Allowing the dough to stand for 2 hours at room temperature.
5. Rolling out the dough (2 mm) and cutting into cracker shapes.
6. Baking in an over at 185° C. (preheating the oven to 210° C.) for 4 minutes.

The crackers were evaluated by a sensory test group (10 persons) with regard to the oral flavor intensity. The evaluation scale ranged from 1-5:

0 no taste 1 very weak flavor note, almost not recognizable 2 flavor note is too weak 3 acceptable taste note 4 good and strong taste note 5 too strong taste note The results are summarized in Table 13.

TABLE 13

| Capsule Type | Mass Relationship Water/Capsule Shell | Mass Relationship Capsule/Cracker | Mass Relationship Flavor/Cracker | Sensory Evaluation |
|---|---|---|---|---|
| Wet | 95% | 3.5% | 0.04% | 1 |
| Lightly Dried | 91% | 2.7% | 0.04% | 1 |
| Medium Dried | 66.7% | 1.3% | 0.04% | 2 |
| Dried | 38.9% | 1% | 0.04% | 4 |

The dried capsules clearly impart on the basis of their heat stability the best sensory results.

EXAMPLE 12

Effect of Varying Aroma Application Designs

This example shows the varying sensory evaluations of leek flavor, which was applied to crackers in liquid form, in stray dried form and in encapsulated form.

The crackers were prepared as described in Example 6 and baked, however at 200° C. for 4 minutes. The sensory evaluation of the 3 varying flavor embodiments summarized in Table 14 are based upon the same definition of scale as in Example 11.

TABLE 14

| Flavor Type | Mass Relationship (Flavor and Carrier) for Example Capsule/Cracker | Mass Relationship Flavor/Cracker | Sensory Evaluation |
|---|---|---|---|
| Liquid | 3.5% | 0.04% | 1 |
| Spray Dried | 2.7% | 0.04% | 2 |
| Capsule | 1.3% | 0.04% | 4 |

The leek flavor encapsulated in alginate capsules showed the best results in regard to the baking stability, compared with the standard flavor embodiments in liquid or, as the case may be, spray dried form.

The invention claimed is:

1. Mononuclearly filled seamless microcapsules, comprising:

a capsule shell of a hardened capsule material based on an acid polysaccharide selected from the group consisting of alginate, pectate, pectinate, carrageenan, gellan and mixtures thereof, and a filler material surrounded on all sides by the capsule shell, including an organoleptically effective amount of a flavor, wherein the mononuclearly filled microcapsules have a diameter ranging from 200 to 1500 micrometers, are heat stable and/or cook stable and/or deep fry stable;

wherein the flavor contained in the filler material comprises a flavor substance with a $\log K_{o/w}<2$;

wherein said capsule shell comprises a divalent cation; and wherein the water portion in the capsule shell is adjusted to a value of ≦50 wt. %, based upon the total mass of the capsule shell.

2. Mononuclearly filled microcapsules according to claim 1, wherein the hardened capsule material for the microcapsules includes a substance hardened by contacting with divalent cations.

3. Mononuclearly filled microcapsules according to claim 1, wherein the flavor contained in the filler material includes at least 10 wt. %, based upon the total mass of the flavor in the filler material, of one or more flavor substances with a $\log K_{o/w}<2$.

4. Mononuclearly filled microcapsules according to claim 1, wherein the flavor contained in the filler material includes at least 10 wt. %, based upon the total mass of the flavor in the filler material, of one or more flavor substances for which the following applies: $1<\log K_{o/w}<2$.

5. Mononuclearly filled microcapsules according to claim 1, wherein the flavor contained in the filler material includes at least 10 wt. %, based upon the total mass of the flavor in the filler material, of one or more flavor substances for which the following applies: $\log K_{o/w}<1$.

6. The mononuclearly filled microcapsules according to claim 1, wherein the microcapsules have a diameter ranging from 400 to 1200 micrometers.

7. The mononuclearly filled microcapsules according to claim 1, wherein the flavor contained in the filler material comprises a flavor substance with a $\log K_{o/w}<1.5$.

8. The mononuclearly filled microcapsule according to claim 1, wherein the flavor contained in the filler material includes at least 1 wt. %, based upon the total mass of the flavor in the filler material, of one or more flavor substances for which the following applies: $\log K_{o/w}<1$.

9. The mononuclearly filled microcapsules according to claim 1, wherein said divalent cation comprises a cation selected from the group consisting of Ca, Zn, Cu, and mixtures therof.

10. The mononuclearly filled microcapsules according to claim 1, wherein said flavor substance is present in a form selected from the group consisting of a solid in dispersion, the water phase of a water-in-oil emulsion, encapsulated in a micelle or liposome, or a combination thereof.

11. The mononuclearly filled microcapsules according to claim 1, wherein said capsule shell further comprises an additive selected from the group consisting of locust bean gum, saccharose, glycerine, propylene glycol, oligosaccharides, maltodextrin, starches, gum arabic, cellulose derivatives, and combinations thereof.

12. The mononuclearly filled microcapsules according to claim 1, wherein said acid polysaccharide is selected from the group consisting of pectate, pectinate, carrageenan, gellan and mixtures thereof.

13. Mononuclearly filled seamless microcapsules, comprising:

a capsule shell of a hardened capsule material based on an acid polysaccharide selected from the group consisting of alginate, pectate, pectinate, carrageenan, gellan and mixtures thereof, and a filler material surrounded on all sides by the capsule shell, including an organoleptically effective amount of a flavor, wherein the mononuclearly filled microcapsules have a diameter ranging from 200 to 1500 micrometers, are heat stable and/or cook stable and/or deep fry stable;

wherein the flavor contained in the filler material comprises a flavor substance with a $\log K_{o/w}<2$; and wherein said capsule shell further comprises an additive selected from the group consisting of locust bean gum, saccharose, glycerine, propylene glycol, oligosaccharides, maltodextrin, starches, gum arabic, cellulose derivatives, and combinations thereof.

14. The mononuclearly filled microcapsules according to claim 13, wherein the flavor contained in the filler material comprises a flavor substance with a $\log K_{o/w}<1.5$.

15. The mononuclearly filled microcapsule according to claim 13, wherein the flavor contained in the filler material includes at least 1 wt. %, based upon the total mass of the flavor in the filler material, of one or more flavor substances for which the following applies: $\log K_{o/w}<1$.

16. The monomuclearly filled seamless microcapsule according to claim 13, wherein said flavor substance is present in a form selected from the group consisting of a solid in dispersion, the water of a water-in-oil emulsion, encapsulated in a micelle or liposome, or a combination thereof.

17. Mononuclearly filled seamless microcapsules, comprising:

a capsule shell of a hardened capsule material based on an acid polysaccharide selected from the group consisting of alginate, pectate, pectinate, carrageenan, gellan and mixtures thereof, and a filler material surrounded on all sides by the capsule shell, including an organoleptically effective amount of a flavor, wherein the mononuclearly filled microcapsules have a diameter ranging from 200 to 1500 micrometers, are heat stable and/or cook stable and/or deep fry stable;

wherein the flavor contained in the filler material comprises a flavor substance with a $\log K_{o/w}<2$, said flavor substance being present in a form selected from the group consisting of a solid in dispersion, the water phase of a water-in-oil emulsion, encapsulated in a micelle or liposome, or a combination thereof; and wherein the water portion in the capsule shell is adjusted to a value of ≦50 wt. %, based upon the total mass of the capsule shell.

18. The mononuclearly filled microcapsules according to claim 17, wherein the flavor substance comprises a flavor substance with a $\log K_{o/w}<1.5$.

19. The mononuclearly filled microcapsule according to claim 17, wherein the flavor contained in the filler material includes at least 1 wt. %, based upon the total mass of the flavor in the filler material, of one or more flavor substances with a $\log K_{o/w}<1$.

20. A foodstuff preparation, including:

one or more mononuclearly filled seamless microcapsules of claim 1, claim 13 or claim 17, and a carrier material for the microcapsule(s).

* * * * *